(12) United States Patent
Kim

(10) Patent No.: US 12,325,482 B2
(45) Date of Patent: Jun. 10, 2025

(54) HANDLE DEVICE AND MOBILE APPARATUS INCLUDING THE SAME

(71) Applicants: Hyundai Motor Company, Seoul (KR); Kia Corporation, Seoul (KR)

(72) Inventor: Do Kon Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 316 days.

(21) Appl. No.: 17/970,767

(22) Filed: Oct. 21, 2022

(65) Prior Publication Data
US 2024/0002011 A1    Jan. 4, 2024

(30) Foreign Application Priority Data
Jun. 29, 2022   (KR) .................. 10-2022-0079813

(51) Int. Cl.
  *B62K 21/16*   (2006.01)
  *B62B 5/06*    (2006.01)
  *B62B 9/20*    (2006.01)
  *B62K 3/00*    (2006.01)
  *B62K 15/00*   (2006.01)

(52) U.S. Cl.
  CPC .......... *B62K 21/16* (2013.01); *B62B 5/067* (2013.01); *B62B 9/20* (2013.01); *B62K 3/002* (2013.01); *B62K 15/00* (2013.01)

(58) Field of Classification Search
  CPC ........ B62B 5/067; B62B 5/064; B62B 5/065; B62B 5/06; F16C 11/10; B62K 21/16; B62K 3/002
  See application file for complete search history.

(56) References Cited

U.S. PATENT DOCUMENTS

| | | | | |
|---|---|---|---|---|
| 4,614,452 A | * | 9/1986 | Wang | F16C 11/10 403/97 |
| 4,821,832 A | * | 4/1989 | Patmont | B62K 15/006 192/58.4 |
| 5,388,659 A | * | 2/1995 | Pepe | B62K 11/10 180/231 |

(Continued)

FOREIGN PATENT DOCUMENTS

| | | |
|---|---|---|
| KR | 200240087 Y1 | 9/2001 |
| KR | 101989735 B1 | 6/2019 |

(Continued)

*Primary Examiner* — Emma K Frick
(74) *Attorney, Agent, or Firm* — Banner & Witcoff, Ltd.

(57) ABSTRACT

A handle device may include a handle upper region, a handle lower region disposed below the handle upper region, and a shaft member configured to penetrate the handle upper region and the handle lower region in a region in which the handle upper region and the handle lower region face each other. A screw thread region provided on an outer surface of the shaft member may be configured to be screw-coupled to the handle upper region and/or the handle lower region at a portion where the shaft member penetrates the handle upper region and the handle lower region. The handle upper region may include an upper concave-convex part, and the handle lower region may include a lower concave-convex part. The lower concave-convex part may have a shape corresponding to the upper concave-convex part so that the handle lower region is able to contact the handle upper region.

19 Claims, 7 Drawing Sheets

(56) References Cited

U.S. PATENT DOCUMENTS

| | | | | |
|---|---|---|---|---|
| 5,927,733 | A * | 7/1999 | Banda | B62K 21/18 188/19 |
| 6,012,539 | A * | 1/2000 | Patmont | B62D 63/00 280/87.041 |
| 6,093,878 | A * | 7/2000 | Hoshino | G10D 13/063 84/421 |
| 6,273,206 | B1 * | 8/2001 | Bussinger | B62D 55/00 180/211 |
| 6,318,741 | B1 * | 11/2001 | Chen | B62K 15/006 280/87.041 |
| 6,789,809 | B2 * | 9/2004 | Lin | B62B 5/085 403/97 |
| 7,461,826 | B2 * | 12/2008 | Carnevali | F16M 13/02 248/292.12 |
| 7,954,831 | B1 * | 6/2011 | Yeh | B62K 15/00 280/14.28 |
| 8,015,759 | B1 * | 9/2011 | Bruce | G09F 7/18 52/25 |
| 8,146,879 | B2 * | 4/2012 | Liao | A45B 11/00 248/278.1 |
| 8,465,033 | B2 * | 6/2013 | Benarrouch | B62K 3/002 280/87.041 |
| 8,984,718 | B2 * | 3/2015 | Ejdehag | F16C 11/10 16/436 |
| 11,318,973 | B2 * | 5/2022 | Kelly | A47C 7/664 |
| 11,388,497 | B1 * | 7/2022 | Kuo | F16B 2/10 |
| 11,440,609 | B2 * | 9/2022 | Jewell | B62K 21/02 |
| 11,460,062 | B2 * | 10/2022 | Kralik | F16B 7/182 |
| 11,707,018 | B2 * | 7/2023 | Driscoll | A01D 34/001 56/229 |
| 12,128,796 | B2 * | 10/2024 | Churilla | B62B 9/20 |
| 2002/0180169 | A1 | 12/2002 | Kwok | |
| 2004/0145141 | A1 * | 7/2004 | Dennis | B62K 3/002 280/87.05 |
| 2020/0031376 | A1 * | 1/2020 | Horowitz | B62B 3/025 |

FOREIGN PATENT DOCUMENTS

| | | |
|---|---|---|
| KR | 1020210073682 A | 6/2021 |
| WO | 2017-016381 F7 | 2/2017 |
| WO | 2021-063433 | 4/2021 |

* cited by examiner

HANDLE DEVICE AND MOBILE APPARATUS INCLUDING THE SAME

CROSS-REFERENCE TO RELATED APPLICATION

This application claims priority to and the benefit of Korean Patent Application No. 10-2022-0079813 filed in the Korean Intellectual Property Office on Jun. 29, 2022, the entire contents of which are incorporated herein by reference.

TECHNICAL FIELD

The present disclosure relates to a handle device and/or a mobile apparatus including the same, and more particularly, to a handle device with improved portability and/or storability, and a mobile apparatus including the same.

BACKGROUND

A mobile apparatus, such as a personal mobility device (e.g., a stroller, a wagon, a mechanical and/or electric kickboard, a mechanical and/or electric scooter, etc.) may broadly comprise a mobile apparatus body and a handle device coupled to the mobile apparatus body. The mobile apparatus body may be configured to provide a space for a person and/or other object to be transported via the mobile apparatus (e.g., a seat, a standing board, a basket, etc.). The handle device may be coupled to the mobile apparatus body and/or configured to be controlled by a person directly (e.g., by grasping with a hand and/or by another mechanical manipulator) and/or indirectly (e.g., by remote control) so as to steer the mobile apparatus.

A mobile apparatus may have a size (e.g., volume, area, length in one or more dimensions) sufficient to accommodate the person and/or object to be transported. It may be difficult to fit the mobile apparatus in and/or through a space. For example, it may be difficult to fit the mobile apparatus in and/or through a building, a vehicle, a door and/or other opening of a building and/or vehicle, a compartment of a building (e.g., a closet, a cabinet, a shed) and/or vehicle (e.g., a trunk, a seating area, an overhead storage, under a seat, etc.), as may be desired, for example, when the personal mobile apparatus is not being used to transport the person and/or object. Also, or alternatively, the size may make it inconvenient to carry the mobile apparatus (e.g., by a person on foot, using a vehicle and/or using public transportation).

There is a need to improve portability and storability of a mobile apparatus by reconfiguring (e.g., reducing a size of) the mobile apparatus (e.g., in a situation in which the mobile apparatus is to be stored and/or transported).

SUMMARY

The following summary presents a simplified summary of certain features. The summary is not an extensive overview and is not intended to identify key or critical elements.

A handle device may comprise a first body, a second body disposed towards an end of the first body and such that a second surface of the second body faces a first surface of the first body and a shaft member configured to penetrate the first body through a first portion of the first surface and the second body through a second portion of the second surface. A screw thread region may be provided on an outer surface of the shaft member. The screw thread region may be capable of being screw-coupled to one or more of the first body or the second body at one or more of the first portion or the second portion. The first body may comprise a first concave-convex part comprising one or more concave-convex shapes disposed peripherally to the first portion. The second body may comprise a second concave-convex part comprising one or more concave-convex shapes disposed peripherally to the second portion. The one or more concave-convex shapes of the second concave-convex part may be shaped corresponding to the one or more concave-convex shapes of the first concave-convex part so that the second surface may be able to be in close contact with the first surface. A mobile apparatus may comprise the handle device coupled to a body of the mobile apparatus.

The present disclosure has been made in an effort to provide a handle device for a mobile apparatus that has a structure capable of innovatively reducing a size of the mobile apparatus, for example, in a situation in which the mobile apparatus is not being used.

These and other features and advantages are described in greater detail below.

DETAILED DESCRIPTION

Figure 1:
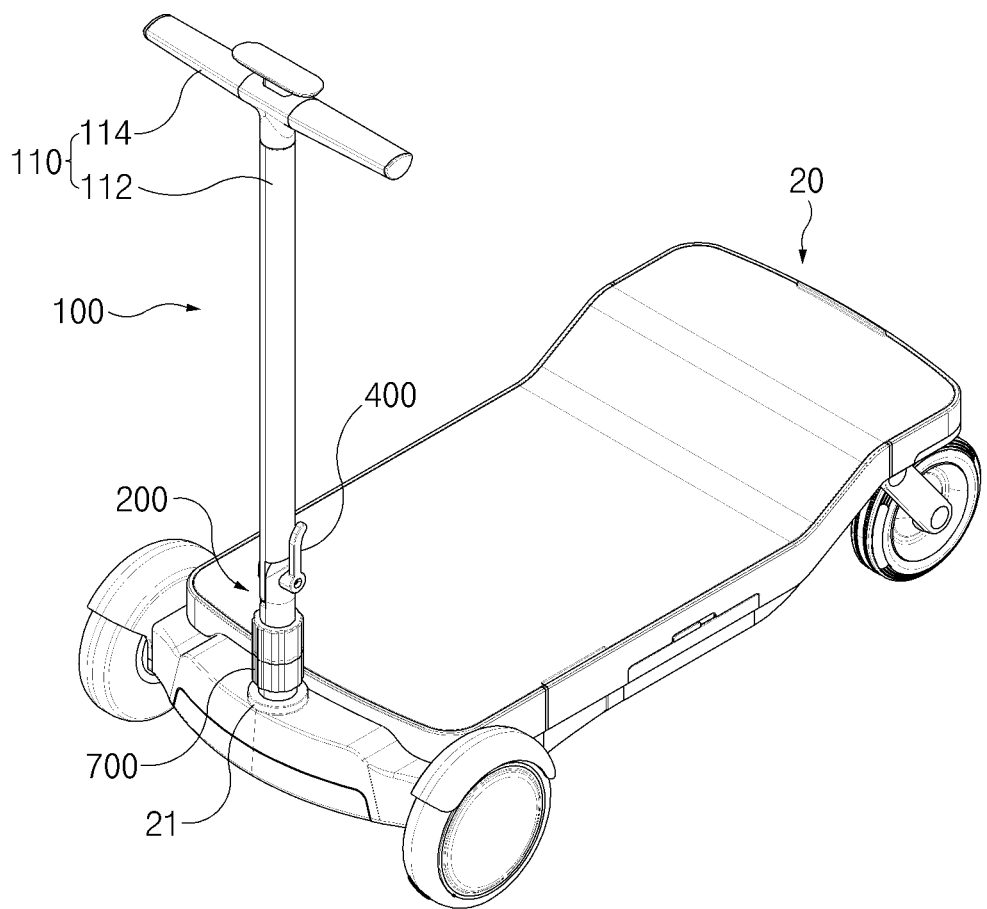
FIG. 1 is a perspective view illustrating a mobile apparatus according to the present disclosure.

Hereinafter, a handle device and a mobile apparatus including the same according to the present disclosure will be described with reference to the drawings.

The handle device according to the present disclosure may be configured to be mounted on a body of the mobile apparatus. The handle device may be configured to allow a user of the mobile apparatus to steer the mobile apparatus (e.g., by rotating the handle device relative to the body of the mobile apparatus).

The handle device may be foldable and/or adjustable, which may reduce a size of the handle device and/or a size of the mobile apparatus including the handle device. The handle device may be coupled to the body of the mobile apparatus in such a way that, when the handle device is folded, the mobile apparatus may be able to stand (e.g., balance) using the folded handle device (see, e.g., FIG. 7, in which the body of the mobile apparatus and the handle upper region are folded towards each other in a vertical direction relative to the drawing).

The handle device and the mobile apparatus comprising the handle device will be described herein referring to upper and lower directions. The upper and lower directions may generally refer to directions away from and towards a surface of a body of the mobile apparatus to which the handle device may be configured to be coupled. For example, when the mobile apparatus comprising the handle device is placed on a ground surface in a travelable manner (e.g., to be able to transport a person and/or object on the ground surface), the handle device may be coupled to an upper surface of the body of the mobile apparatus (e.g., a facing at least in part away from the ground surface) and may extend in an upward/downward direction. One skilled in the art will understand that these directions are for ease of discussion and that the handle device may be separate from a mobile apparatus and/or may be coupled to the mobile apparatus in any direction relative to the body of the mobile apparatus and/or a ground surface on which the mobile apparatus may be placed. Moreover, the mobile apparatus comprising the handle apparatus of the present disclosure may be oriented in any direction relative to a ground surface or any other surface.

Figure 2:
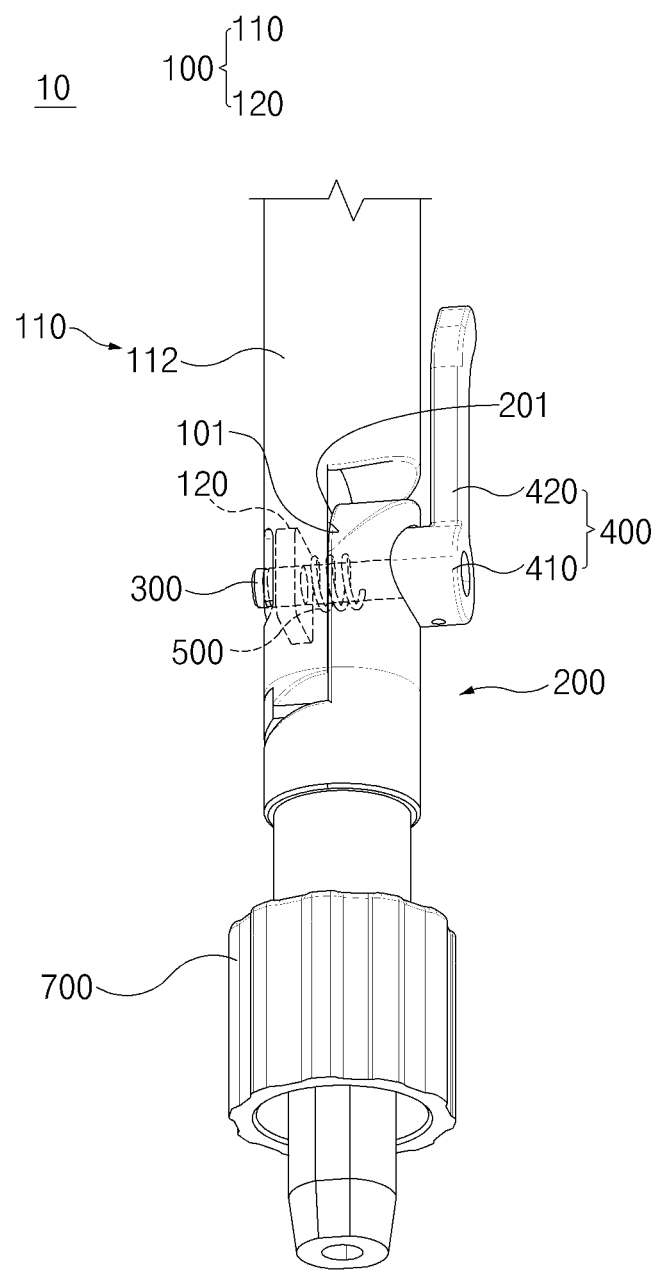
FIG. 2 is a perspective view of a region of a handle upper region and a handle lower region of a handle device according to the present disclosure are coupled.
Figure 3:
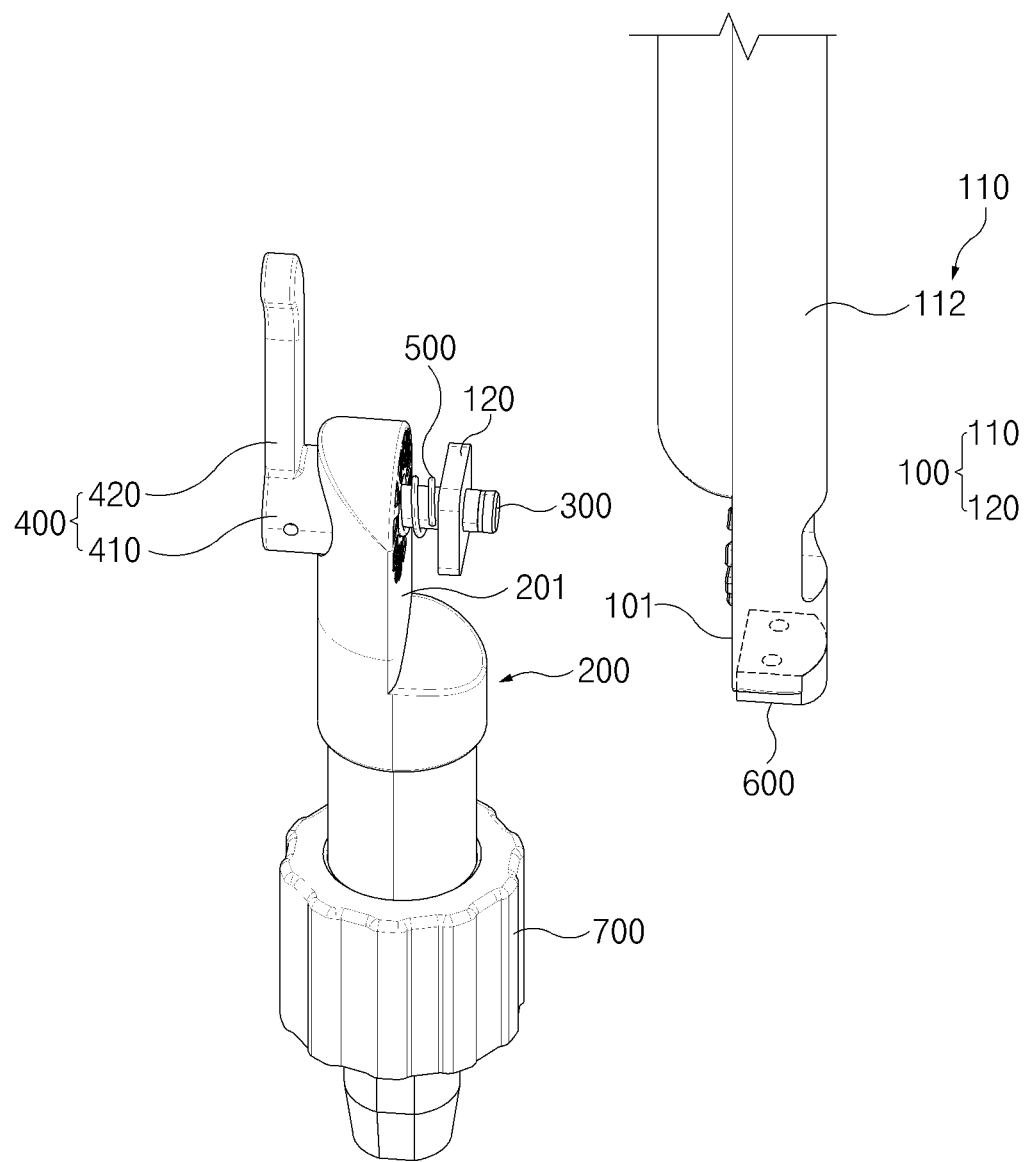
FIG. 3 is a perspective view illustrating a state in which the handle upper region and the handle lower region of the handle device according to the present disclosure are disassembled.
Figure 4:
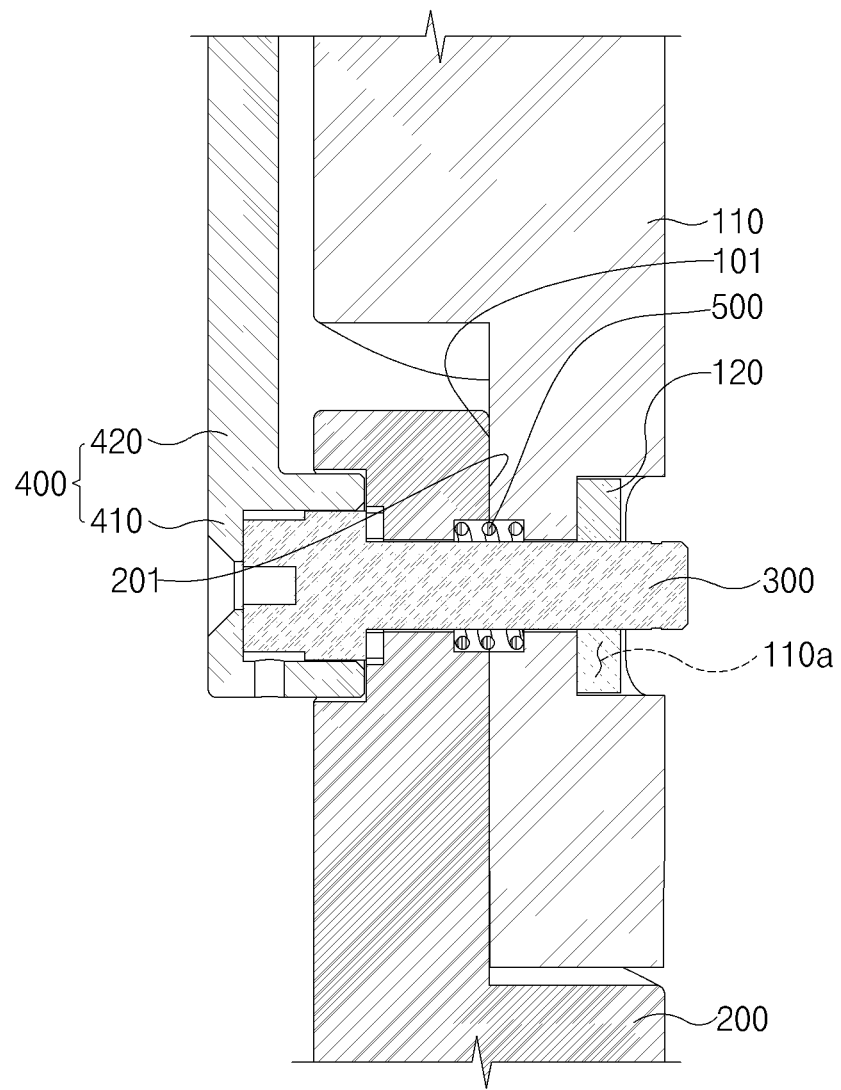
FIG. 4 is a cross-sectional view illustrating the region in which the handle upper region and the handle lower region of the handle device according to the present disclosure are coupled.
Figure 5:
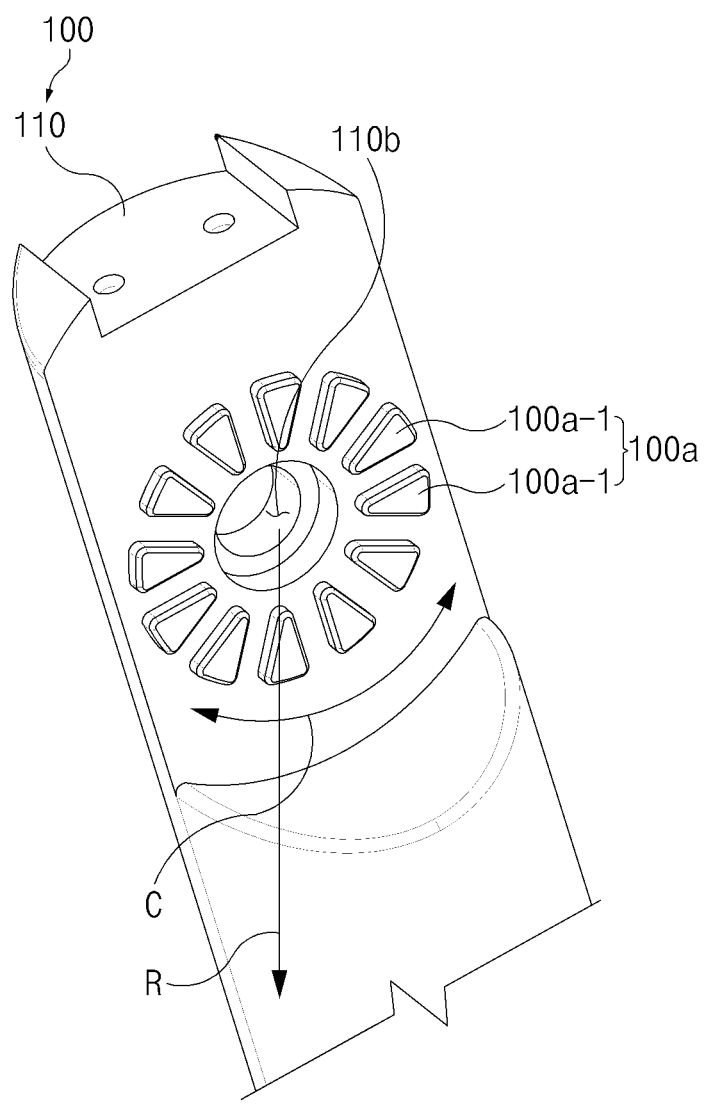
FIG. 5 is an enlarged view illustrating a region of the handle upper region of the handle device according to the present disclosure that is coupled to the handle lower region.
Figure 6:
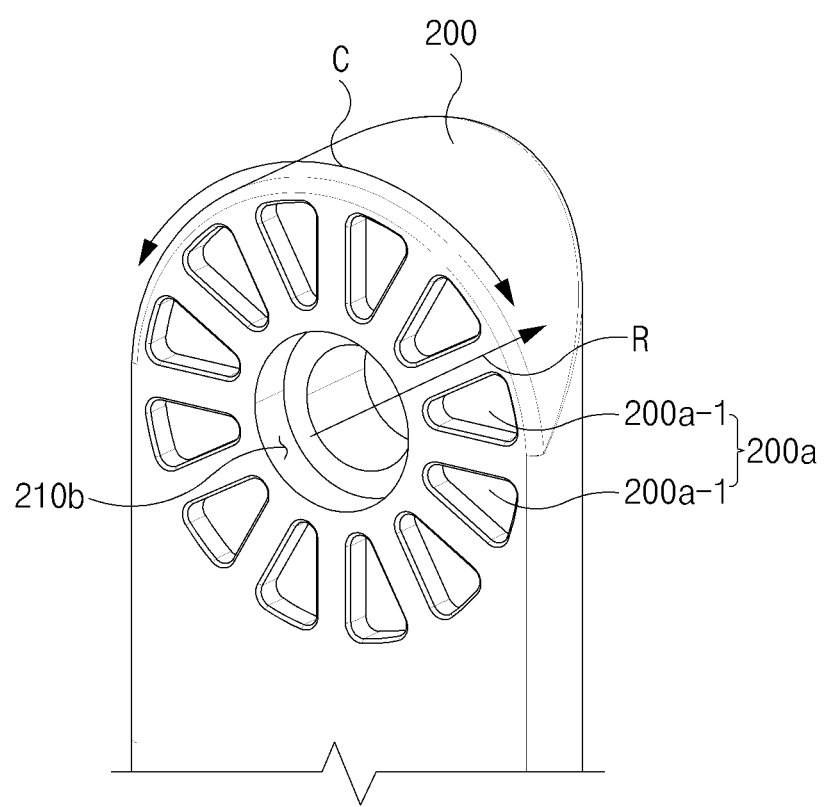
FIG. 6 is an enlarged view illustrating a region of the handle lower region of the handle device according to the present disclosure that is coupled to the handle upper region.
Figure 7:
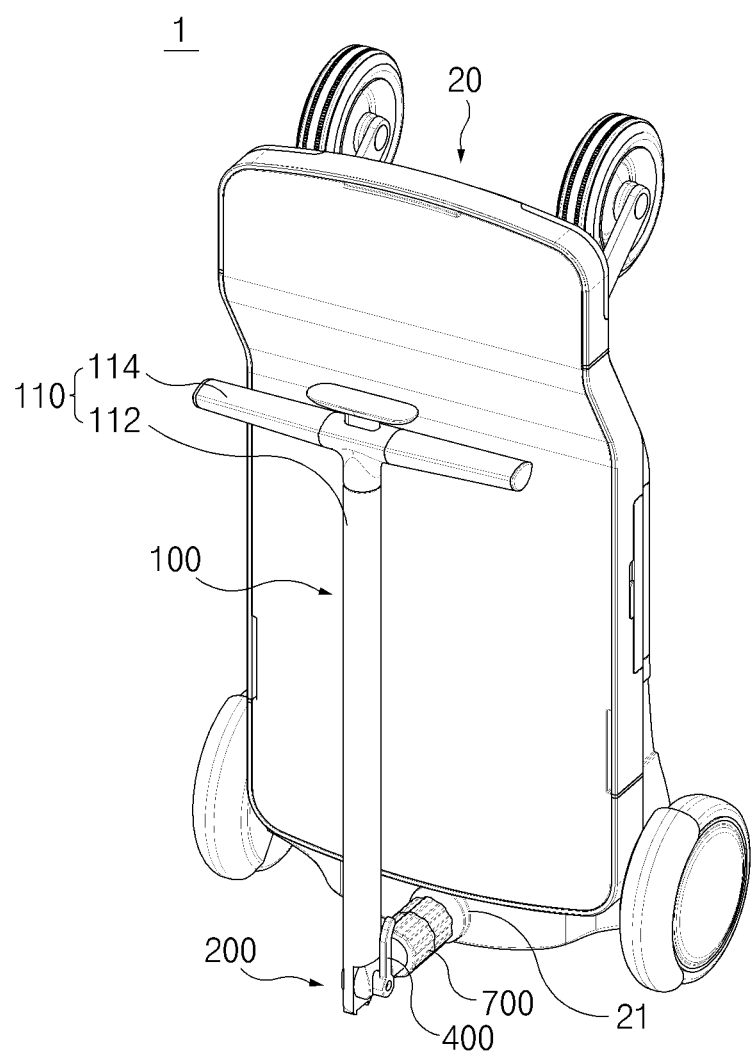
FIG. 7 is a perspective view illustrating a state in which the mobile apparatus stands after the handle device according to the present disclosure is folded.

FIG. 1 is a perspective view illustrating a mobile apparatus according to the present disclosure. FIG. 2 is an enlarged perspective view of a region in which a handle upper region and a handle lower region of a handle device according to the present disclosure are coupled. FIG. 3 is an enlarged perspective view illustrating a state in which the handle upper region and the handle lower region of the handle device according to the present disclosure are disassembled, and FIG. 4 is a cross-sectional view illustrating the region in which the handle upper region and the handle lower region of the handle device according to the present disclosure are coupled. FIG. 5 is an enlarged view illustrating a region of the handle upper region of the handle device according to the present disclosure that is coupled to the handle lower region, and FIG. 6 is an enlarged view illustrating a region of the handle lower region of the handle device according to the present disclosure that is coupled to the handle upper region. In addition, FIG. 7 is a perspective view illustrating a state in which the mobile apparatus stands after the handle device according to the present disclosure is folded.

Referring to FIGS. 1 and 2, a handle device 10 may comprise: a handle upper region 100; and a handle lower region 200 provided towards an end of the handle upper region 100 (e.g., such that the handle upper region 100 is capable of extending away from a body 20 of the mobile apparatus 1 comprising the handle device 10 when the handle lower region 200 is coupled to the body of the mobile apparatus). The handle lower region may comprise a surface configured to at least partially face a corresponding surface of the handle upper region 100.

The handle upper region 100 and the handle lower region 200 may be coupled to be rotatable relative to each other in a region in which the corresponding faces of the handle upper region 100 and the handle lower region 200 face each other. The handle device 10 may further comprise a shaft member 300 configured to penetrate the handle upper region 100 and/or the handle lower region 200. The shaft member 300 may be provided in the region in which the corresponding surfaces of the handle upper region 100 and the handle lower region 200 face each other. The handle upper region 100 and the handle lower region 200 may be configured to be rotatable about the shaft member 300 as a rotation axis when the shaft member 300 penetrates the handle upper region 100 and/or the handle lower region 200. In a mobile apparatus 1 comprising the handle device 10, the handle lower region 200 may have a shape extending away from a surface, of the mobile apparatus 1, to which the handle lower region 200 is coupled, and the shaft member 300 may have a shape that extends substantially parallel to at least a portion of the surface of the mobile apparatus to which the handle lower region 200 is coupled. The shaft member 300, when provided in the region in which the corresponding surfaces of the handle upper region 100 and the handle lower region 200 face each other, may extend in a direction substantially perpendicular to a direction in which the handle lower region extends. As illustrated in FIGS. 2-4, one side surface 101 of a lower end of the handle upper region 100 (e.g., facing substantially left in FIG. 2 and substantially right in FIGS. 3-4) may face a corresponding side surface 201 of an upper end of the handle lower region 200 (e.g., facing substantially right in FIG. 2 and substantially left in FIGS. 3-4). The shaft member 300 may configured to penetrate one side surface 101 of the handle upper region 100 based on the horizontal direction and/or one side surface 201 of the handle lower region 200 (e.g., by extending through one or both of the surfaces in the horizontal direction of FIGS. 2-4). The shaft member 300 may be configured to penetrate the handle upper region 100 and/or the handle lower region 200 in a direction perpendicular to the side surface 101 of the handle upper region 100 and/or the side surface 201 of the handle lower region 200 (e.g., in a substantially horizontal direction in FIGS. 2-4).

The handle device 10 may be foldable and/or adjustable shape (e.g., adjustable to a configuration suitable for a user). The handle upper region 100 and the handle lower region 200 may be rotatable about the shaft member 300 when the shaft member 300 is configured to penetrate the handle upper region 100 and/or the handle lower region 200. In contrast, the handle upper region 100 and the handle lower region 200 of the handle device 10 may be fixedly coupled to each other while the mobile apparatus 1 is in use (e.g. to transport a person and/or object) and/or when the handle device 10 is otherwise not foldable and/or adjustable. To this end, a structure may be capable of fixedly coupling the handle upper region 100 and the handle lower region 200 and allowing for decoupling of the handle upper region 100 and the handle lower region 200. When the handle upper region 100 and the handle lower region 200 are fixedly coupled, the handle upper region 100 and the handle lower region 200 may be in close contact with each other in the region where the corresponding surfaces (e.g., side surfaces in FIGS. 2-4 and discussed above) of the handle upper region 100 and the handle lower region 200 face each other. When the handle upper region 100 and the handle lower region 200 are decoupled, the handle upper region 100 and the handle lower region 200 may be capable of being spaced apart from each other (e.g., in a direction in which the shaft member 300 is configured to extend through the.

A screw thread region may be provided on an outer surface of the shaft member 300. The screw thread region of the shaft member 300 may configured to be screw-coupled to the handle upper region 100 and/or the handle lower region 200 in a configuration in which the shaft member 300 penetrates the handle upper region 100 and the handle lower region 200. This configuration may also be a configuration in which at least a part of the shaft member 300 serves as a role similar to a bolt, and the handle upper region 100 and/or the handle lower region 200 serves as a role similar to a nut.

In a configuration in which the screw coupling is implemented between the shaft member 300 and the handle upper region 100, a relative position between the shaft member 300 and the handle upper region 100 may be adjusted by rotating the shaft member 300. This may allow for adjusting how close the handle upper region 100 and the handle lower region 200 are to each other and/or adjusting a force of contact between the handle upper region 100 and the handle lower region 200 (e.g., at the corresponding surfaces that face each other). Also, or alternatively, when the screw coupling is implemented between the shaft member 300 and the handle lower region 200, a relative position between the shaft member 300 and the handle lower region 200 may be adjusted by rotating the shaft member 300. This may similarly allow for adjusting how close the handle upper region 100 and the handle lower region 200 are to each other and/or adjusting a force of contact between the handle upper region 100 and the handle lower region 200 (e.g., at the corresponding surfaces that face each other).

In a case in which the handle upper region 100 and the handle lower region 200 are in close contact with each other by rotating the shaft member 300 to couple the handle upper region 100 and the handle lower region 200, a force between the handle upper region 100 and the handle lower region 200 may be insufficient to fixedly couple the handle upper region 100 and the handle lower region 200 if one or more of the corresponding surfaces of the handle upper region 100 and/or the handle lower region 200 that face each other are substantially flat and/or otherwise shaped such that they can rotate relative to each other even when in close contact. In the case in which one or more of the corresponding surfaces are substantially flat, for example, the handle upper region 100 and/or the handle lower region 200 may be rotated relative to each other and/or the body 20 (e.g., by external force on one or more of the handle upper region 100, the handle lower region 200, and/or the body 20) even when the handle upper region 100 and the handle lower region 200 are in close contact with each other. If this occurs while the mobile apparatus travels, for example, a safety incident could occur, such as an user grasping the handle device 10 could get hurt from a fall. An additional means capable of increasing the fixing/coupling force between the handle upper region 100 and the handle lower region 200 in the state in which the handle upper region 100 and the handle lower region 200 are in close contact with each other may be to avoid such problems.

One or more concave-convex structures may be respectively formed at the corresponding surfaces of the handle upper region 100 and/or the handle lower region 200 in the region in which the handle upper region 100. The concave-convex structures may have shapes that at least partially correspond to each other (e.g., fit into each other and/or extend past each other when the corresponding surfaces of the handle upper region 100 and the handle lower region 200 face each other and are close and/or in contact with each other).

More specifically, the surface of the handle upper region 100 configured to face the corresponding surface of the handle lower region 200 may include an upper concave-convex part 100a provided to a periphery of a portion where the shaft member 300 may be configured to penetrate the handle upper region 100, and the upper concave-convex part 100a may comprise one or more concave-convex shapes disposed along the periphery. The surface of the handle lower region 200 configured to fac (e.g., repeatedly and/or in a pattern) e the corresponding surface of the handle upper region 200 may include a lower concave-convex part 200a provided to a periphery of a portion where the shaft member 300 may be configured to penetrate the handle lower region 200, and the lower concave-convex part 200a may comprise one or more concave-convex shapes disposed (e.g., repeatedly and/or in a pattern) along the periphery.

The lower concave-convex part 200a may have a shape corresponding to a shape of the upper concave-convex part 100a, such that in a case that the upper concave-convex part 100a or the lower concave-convex part 200a comprises an inwardly recessed shape (e.g., recessed into a body of the handle upper region 100 or the handle lower region 200, respectively), the other of the upper concave-convex part 200a and the lower concave-convex part 100a comprises an outwardly protruding shape (e.g., protruding outward from the body of the handle. The upper concave-convex part 100a and the lower concave-convex part 200a may be capable of being fitted to the other of the upper concave-convex part 200a and the lower concave-convex part 100a, respectively, when the corresponding surfaces face each other and are brought close to and/or in contact with each other. Even if an external force is applied, the handle upper region 100 and the handle lower region 200 may be fixedly coupled to each other, because rotations between the handle upper region 100 and the handle lower region 200 may be prevented by a more than a static frictional force present in the region where the handle upper region 100 and the handle lower region 200 contact with each other, but also by interference between the upper concave-convex part 100a and the lower concave-convex part 200a extending past each other.

The handle upper region 100 and the handle lower region 200 may be configured such that the corresponding surfaces are sufficiently far away from each other (e.g., by rotating the shaft member 300, the handle upper region 100 and the handle lower region 200 in close contact with each other may be moved apart from each other) such that the upper concave-convex part 100a and the lower concave-convex part 200a may be decoupled, such that the handle upper region 100 and the handle lower region 200 may rotate relative to each other.

FIG. 5 shows an example in which the upper concave-convex part 100a of the handle upper region 100 comprises a plurality of convex-concave portions 100a-1 protruding outward and disposed along the periphery of a portion where the shaft member 300 may be able to penetrate the handle upper region 100. FIG. 6 shows an example in which the lower concave-convex part 200a of the handle lower region 200 comprises a plurality of convex-concave portions 200a-1 recessed inward and disposed along a portion where the shaft member 300 may be able to penetrate the handle lower region 200. While twelve convex/concave portions 100a-1 and twelve convex/concave portions 200a-1 are shown in FIGS. 5-6, any number of convex/concave portions 100a-1 and any number of convex/concave portions 200a-1 may be provided and may be protruding and/or recessed in any combination such that at least one of a convex/concave portion 100a-1 or a convex/concave portion 200a-1 can be fit into at least one of a convex/concave portion 200a-1 or a convex/concave portion 200a-1 when the corresponding surfaces face each other and are brought close (e.g., into close contact).

A shape and/or size of the convex/concave portion 100a-1 may correspond to a shape and/or size of the recessed portion 200a-1. The convex/concave portions 100a-1 may be capable of being inserted into the convex/concave portions 200a-1, which may make it possible to prevent the handle upper region 100 and the handle lower region 200 from rotating relative to each other.

FIGS. 5 and 6, the convex/concave portion 100*a*-1 and the convex/concave portion 200*a*-1 may each have a shape having a width in a circumferential direction C (e.g., around the portions that the shaft member 300 may be able to penetrate). In an example, the width may increase in an increasing radial direction R (e.g., relative to the portions that of the shaft member 300 may be able to penetrate). The convex/concave portion 100*a*-1 and the convex/concave portion 200*a*-1 may each, for example, have an approximately trapezoidal and/or triangular shape.

At least one of the upper convex-concave part 100*a* or the lower convex-concave part 200*a* may comprise a plurality of convex/concave portions 100*a*-1 or a plurality of convex/concave portions 200*a*-1. The plurality of convex/concave portions 100*a*-1 or the plurality of convex/concave portions 200*a*-1 may be provided in sufficient numbers and/or with spacing in the circumferential direction such that a relative rotation angle between the handle upper region 100 and the handle lower region 200 may be adjusted to meet the user's needs, and then fixedly coupled to each other. For example, when the twelve convex/concave portions 100*a*-1 and the twelve convex/concave portions 200*a*-1 are provided at equal intervals, as illustrated in FIGS. 5 and 6, the rotation angle between the handle upper region 100 and the handle lower region 200 may be adjusted to a value made by dividing 360 degrees by 12, i.e., to 30 degrees, which may be a small enough angle to meet most user's needs.

The screw thread region provided on the outer surface of the shaft member 300 may be capable of being screw-coupled to the handle upper region 100 and/or the handle lower region 200. For example, FIG. 4 shows the screw thread region provided on the outer surface of the shaft member 300 may be capable of being screw-coupled to the handle upper region 100. Also, or alternative to the configuration illustrated in the drawings, the screw thread region of the shaft member 300 may be capable of being screw-coupled to the handle lower region 200.

Referring to FIGS. 2 and 4, the handle upper region 100 may comprise: a handle upper body 110 configured to define a body of the handle upper region 100 that comprises the upper concave-convex part 100*a*; and/or a handle upper nut member 120 which may be provided separately from the handle upper body 110 and capable of being screw-coupled to the screw thread region of the shaft member 300. In this case, a recessed region 110*a* may be provided in the handle upper body 110, and the handle upper nut member 120 may be capable of being inserted into the recessed region 110*a* of the handle upper body 110. For example, FIG. 4 illustrates a state in which the recessed region 110*a* is provided in an outer surface of the handle upper body 110 that is opposite to an outer surface of the handle upper body 110 that faces the handle lower region 200.

Also, or alternatively, the screw thread region of the shaft member 300 may be capable of being screw-coupled to the handle lower region 200. The handle lower region 200 may comprise: a handle lower body configured to define a body of the handle lower region 200 and having the lower concave-convex part 200*a*; and/or a handle lower nut member provided separately from the handle lower body and capable of being screw-coupled to the screw thread region of the shaft member 300.

FIG. 1 shows the handle upper body 110 may comprise: an upper rod region 112 extending in substantially in one direction and comprising a lower end with the surface configured to face the handle lower region 200 and be penetrated by the shaft member 300; and an upper handle region 114 extending in a direction at least somewhat different from the direction in which the upper rod region 112 substantially extends and/or from an upper end of the upper rod region 112. The upper handle region 114 may be configured to be grasped by a user.

The fixed coupling or the decoupling between the handle upper region 100 and the handle lower region 200, may be implemented by rotational motion of the shaft member 300. For example, a user may fixedly couple and/or decouple the handle upper region 100 and the handle lower region 200 by rotating the shaft member 300. The handle device 10 may comprise a features that facilitate rotating the shaft member 300.

As shown in FIGS. 1 to 4, the handle device 10 may further include a lever member 400 coupled to one end of the shaft member 300, wherein the end may be opposite another end of the shaft member 300 configured to penetrate the one or more of the handle upper region 100 and/or the handle lower region 200. The lever member 400 may comprise a lever body region 410 into which the end of the shaft member 300 may be inserted and/or coupled. The lever member may also, or alternatively, comprise a lever extension region 420 extending in a direction from a side of the lever body region 410 and/or the end of the shaft member 300. More specifically, the lever extension region 420 may extend in a direction away from direction in which the shaft member 300 extends (e.g., substantially perpendicular from the direction in which the shaft member 300 extends). Therefore, the user may grasp the lever extension region 420 and rotate the lever member 400, such that the shaft member 300 fixedly coupled to the lever member 400 may rotate.

As illustrated in FIG. 4, the lever body region 410 may face the handle upper region 100, with the handle lower region 200 interposed therebetween, at the portion where the shaft member 300 is configured to penetrate the handle upper region 100 and the handle lower region 200. The lever member 400 may be provided at a side of the handle lower region 200 when the shaft member 300 is inserted in the handle upper region 100 and/or the handle lower region 200. Also, or alternatively, the lever body region 410 may face the handle lower region 200, with the handle upper region 100 interposed therebetween, at the portion where the shaft member 300 is configured to penetrate the handle upper region 100 and the handle lower region 200. The lever member 400 may be provided at a side of the handle upper region 100 when the shaft member 300 is inserted in the handle upper region 100 and/or the handle lower region 200.

Referring to FIGS. 2 to 4, the handle device 10 may further include a spring member 500 inserted into the handle upper region 100 and/or the handle lower region 200 and configured to surround the outer surface of the shaft member 300 when the shaft member 300 penetrates the handle upper region 100 and/or the handle lower region 200.

The spring member 500 (e.g., an at least partially elastically compressible member) may be configured to be compressed by the handle upper region 100 and/or the handle lower region 200 in the direction in which the handle upper region 100 and the handle lower region 200 can move towards and/or away from each other. When a fixed coupling between the handle upper region 100 and the handle lower region 200 is released, for example, via manipulation of the lever member 400 and/or rotating the shaft member 300, as discussed above, an elastic force applied by the compressed spring member 500 in the direction in which the handle upper region 100 and the handle lower region 200 are able to move away from each other may cause the handle upper region 100 and the handle lower region 200 to move away from each other (e.g., no longer be in close contact with each other, as they may have been when fixedly coupled). This may allow for easily adjusting the rotation angle between the handle upper region 100 and the handle lower region 200. For example, the spring member 500 may be configured to be compressed by the handle upper region 100 and the handle lower region 200 at least when the corresponding surfaces of the handle upper region 100 and the handle lower region 200 face each other and are close enough to cause interference between the convex/concave portions 100a-1 and the convex/concave portions 200a-1. As such, the spring member 500 may facilitate the corresponding surfaces moving far enough apart to prevent interference between the convex/concave portions 100a-1 and the convex/concave portions 200a-1, thereby facilitating a process of adjusting the rotation angle between the handle upper region 100 and the handle lower region 200. The spring member 500 may be in a compressed state in the state in which the handle upper region 100 and the handle lower region 200 are in close contact with each other. The handle upper nut member 120 may support the spring member 500 in the horizontal direction, such that the handle upper region 100 having the handle upper nut member 120 may be pressed in the horizontal direction. by the spring member 500 when the spring member 500 is compressed.

As illustrated in FIG. 5, a first recessed space 110b having an inwardly recessed shape may be provided in a surface of the handle upper region 100 that faces the handle lower region 200 in the horizontal direction (e.g., a normal to the surface of the handle upper region 100 that faces the handle lower region 200). As illustrated in FIG. 6, a second recessed space 210b having an inwardly recessed shape and configured to communicate with the first recessed space 110b may be provided in a surface of the handle lower region 200 that faces the handle upper region 100 in the horizontal direction. The spring member 500 may be able to be accommodated in an internal space defined by the first recessed space 110b and the second recessed space 210b. A partial region of the shaft member 300, which may be configured to penetrates the handle upper region 100 and/or the handle lower region 200, may be accommodated in the internal space defined by the first recessed space 110b and the second recessed space 210b.

Referring to FIGS. 4 to 6, at least a part of an inner surface of the handle upper region 100 (e.g., a surface that defines the first recessed space 110b), may be configured to cause the spring member 500 (e.g., when inserted in the first recessed space 110b) to be compressed and/or extend in the horizontal direction. Also, or alternatively, at least a part of an inner surface of the handle lower region 200 (e.g., a surface that defines the second recessed space 210b), may be configured to cause the spring member 500 to be compressed and/or extend in the horizontal direction. The spring member 500 may have a structure that may be compressed by the handle upper region 100 and/or the handle lower region 200 in the horizontal direction in which the shaft member 300 extends. This structure may serve to allow the spring member 500 to press the handle upper region 100 and/or the handle lower region 200 in a direction in which the handle upper region 100 and the handle lower region 200 move away from each other, as described above.

Referring to FIG. 3, the handle device 10 may also comprise one or more features for protecting one or more of the above mentioned components of the handle device 10. The features, as will be described below, may be capable of protecting the components of the handle device 10 when the handle device 10 is folded (e.g., protected from contact with a surface, such as the ground surface).

The mobile apparatus may be configured to be able to stands (e.g., balance) in a configuration in which the handle device 10 is folded (e.g., to reduce a size of the mobile apparatus equipped with the handle device 10). A lower end of the handle upper region 100, (e.g., a lower end of the handle upper body 110) may be configured to face and/or contact a surface (e.g., the ground surface) in the configuration in which the mobile apparatus stands. This may risk damaging handle upper body 110 when the lower end of the handle upper body 110 comes into contact with the surface.

The handle device 10 may further include a support member 600 coupled to a lower surface (e.g., a surface that may be configured to contact the surface in a case that the mobile apparatus is standing, as described above) of the lower end of the handle upper region 100 (e.g., the handle upper body 110). The support member 600 may be made of a material capable of absorbing impact that may occur when the support member 600 comes into contact with the surface. For example, the support member 600 may comprise a rubber material such as urethane. A mobile apparatus 1 according to the present disclosure may comprise the handle device 10, and a body 20 to which the handle device 10 may be coupled. The handle device 10 provided in the mobile apparatus 1 according to the present disclosure may be the handle device 10 as described above.

The mobile apparatus 1 may also, or alternatively, comprise a cap member 700. The cap member 700 may be provided at the lower end of the handle lower region 200 of the handle device 10. A screw thread region may be provided on an inner surface of the cap member 700.

The body 20 may also, or alternatively comprise a locking part 21 provided in a region in which the handle device 10 may be coupled. The locking part 21 may form a space into which the lower end of the handle lower region 200 may be inserted. A screw thread region may be provided on an outer surface of the locking part 21. The screw thread region may have a shape corresponding to the inner surface of the cap member 700, which may allow the handle device 10 and the body 20 to be couplable by inserting the lower end of the handle lower region 200 into the locking part 21 and screw-coupling the cap member 700 and the locking part 21 by rotating the cap member 700. The handle device 10 may be separable from the body 20, for example, by release of the screw-coupling between the cap member 700 and the locking part 21 by rotating the cap member 700, which may allow for separating the handle lower region 200 from the locking part 21.

A handle device may comprise: a handle upper region; a handle lower region disposed toward the handle upper region and configured to partially face the handle upper region; and a shaft member configured to penetrate the handle upper region and the handle lower region in a region in which the handle upper region and the handle lower region face each other, in which a screw thread region is provided on an outer surface of the shaft member, in which the screw thread region is screw-coupled to the handle upper region or the handle lower region at a portion where the shaft member penetrates the handle upper region and the handle lower region, in which the handle upper region includes an upper concave-convex part provided along a periphery of the portion where the shaft member penetrates the handle upper region, the upper concave-convex part having concave-convex shapes repeatedly disposed along the periphery, and in which the handle lower region includes a lower concave-convex part provided along a periphery of the portion where the shaft member penetrates the handle lower region, the lower concave-convex part having concave-convex shapes repeatedly disposed along the periphery and having a shape corresponding to the upper concave-convex part so that the handle lower region is able to be in close contact with the handle upper region.

The upper concave-convex part may include a plurality of protruding portions protruding outward and disposed along the periphery of the portion where the shaft member penetrates the handle upper region, the lower concave-convex part may include a plurality of recessed portions recessed inward and disposed along the periphery of the portion where the shaft member penetrates the handle lower region, and a shape and size of the protruding portion may correspond to a shape and size of the recessed portion.

The protruding portion and the recessed portion may each have a shape having a width based on a circumferential direction C of the shaft member, and the width may increase as the distance from the shaft member increases in a radial direction R of the shaft member.

The upper concave-convex part may include a plurality of recessed portions recessed inward and disposed along the periphery of the portion where the shaft member penetrates the handle upper region, the lower concave-convex part may include a plurality of protruding portions protruding outward and disposed along the periphery of the portion where the shaft member penetrates the handle lower region, and a shape and size of the recessed portion may correspond to a shape and size of the protruding portion.

The screw thread region provided on the outer surface of the shaft member may be screw-coupled to the handle upper region.

The screw thread region provided on the outer surface of the shaft member may be screw-coupled to the handle lower region.

The handle upper region may include: a handle upper body configured to define a body of the handle upper region and having the upper concave-convex part; and a handle upper nut member provided separately from the handle upper body and screw-coupled to the screw thread region.

The handle upper body may have a recessed region, and the handle upper nut member may be inserted into the recessed region of the handle upper body.

The handle lower region may include: a handle lower body configured to define a body of the handle lower region and having the lower concave-convex part; and a handle lower nut member provided separately from the handle lower body and screw-coupled to the screw thread region of the shaft member.

The handle device may further include: a lever member fixedly coupled to one end of the shaft member based on a longitudinal direction of the shaft member, in which the lever member includes: a lever body region into which the shaft member is inserted and coupled; and a lever extension region extending in one direction from one side of the lever body region.

The lever body region may face the handle upper region, with the handle lower region interposed therebetween, at the portion where the shaft member penetrates the handle upper region and the handle lower region.

The handle device may further include a spring member inserted into the handle upper region and the handle lower region and configured to surround the outer surface of the shaft member.

A first recessed space having a shape recessed inward may be provided in a surface of the handle upper region facing the handle lower region, a second recessed space having a shape recessed inward and configured to communicate with the first recessed space may be provided in a surface of the handle lower region facing the handle upper region, and the spring member may be accommodated in an internal space defined by the first recessed space and the second recessed space.

At least a part of an inner surface of the handle upper region, which defines the first recessed space, may face the spring member in a horizontal direction, and at least a part of an inner surface of the handle lower region, which defines the second recessed space, may face the spring member in the horizontal direction.

The spring member may be in a compressed state in a state in which the handle upper region and the handle lower region are in close contact with each other.

The handle device may further include a support member fixedly coupled to a lower surface of a lower end of the handle upper region, in which the support member includes a rubber material.

A mobile apparatus may comprise: the handle device; a body to which the handle device may be coupled; and a cap member provided at a lower end of the handle lower region of the handle device and having a screw thread region provided on an inner surface thereof, in which the body includes a locking part provided in a region in which the handle device is coupled, the locking part having a space into which the lower end of the handle lower region is insertable, and in which a screw thread region is provided on an outer surface of the locking part and has a shape corresponding to the inner surface of the cap member.

According to the present disclosure, it is possible to provide the handle device for a mobile apparatus that has a structure capable of innovatively reducing the volume of the mobile apparatus in the situation in which the mobile apparatus is not used.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A handle device comprising:
   a handle upper region;
   a handle lower region disposed towards an end of the handle upper region and such that a second surface of the handle lower region faces a first surface of the handle upper region;
   a shaft member configured to penetrate the handle upper region through a first portion of the first surface and the handle lower region through a second portion of the second surface of the handle lower region; and,
   a support member coupled to a lower surface of a lower end of the handle upper region,
   wherein a screw thread region is provided on an outer surface of the shaft member,
   wherein the screw thread region is capable of being screw-coupled to one or more of the handle upper region or the handle lower region at one or more of the first portion or the second portion,
   wherein the handle upper region comprises an upper concave-convex part comprising one or more concave-convex shapes disposed peripherally to the first portion,
   wherein the handle lower region comprises a lower concave-convex part comprising one or more concave-convex shapes disposed peripherally to the second portion, wherein the one or more concave-convex shapes of the lower concave-convex part are shaped corresponding to the one or more concave-convex shapes of the upper concave-convex part so that the second surface of the handle lower region is able to be in close contact with the first surface, and wherein the support member comprises a rubber material, and wherein a surface of the support member is exposed by a rotation of the handle upper region such that the exposed surface of the support member is able to contact a ground surface.

2. The handle device of claim 1, wherein the upper concave-convex part comprises a plurality of protruding portions protruding outward from the handle upper region and disposed along a periphery of the first portion, the lower concave-convex part comprises a plurality of recessed portions recessed inward into the handle lower region and disposed peripherally to the second portion, and wherein a shape of the plurality of protruding portions correspond to a shape of the plurality of recessed portions.

3. The handle device of claim 1, wherein the one or more concave-convex shapes of the upper concave-convex part each have a shape having a width, in a circumferential direction C relative to the first portion, that increases in a radial direction R away from the first portion.

4. The handle device of claim 1, wherein the upper concave-convex part comprises a plurality of recessed portions recessed inward into the handle upper region and disposed peripherally to the first portion, the lower concave-convex part comprises a plurality of protruding portions protruding outward from the handle lower region and disposed along a periphery of the second portion, and wherein a shape of the plurality of recessed portions correspond to a shape of the plurality of protruding portions.

5. The handle device of claim 1, wherein the screw thread region provided on the outer surface of the shaft member is capable of being screw-coupled to the handle upper region.

6. The handle device of claim 1, wherein the screw thread region provided on the outer surface of the shaft member is capable of being screw-coupled to the handle lower region.

7. The handle device of claim 1, further comprising a nut member provided separately from the handle upper region and the handle lower region and capable of being screw-coupled to the screw thread region.

8. The handle device of claim 7, wherein the handle upper region comprises a recessed region configured to be able to accept the nut member into the recessed region.

9. The handle device of claim 1, further comprising:
a lever member coupled to an end of the shaft member, wherein the lever member comprises:
a lever body region coupled to the shaft member; and
a lever extension region extending in a direction away from a side of the lever body region.

10. The handle device of claim 9, wherein the lever body region is configured to be on a first side of the handle lower region relative to the handle upper region when the shaft member penetrates the handle upper region and the handle lower region.

11. The handle device of claim 1, further comprising:
a spring member inserted into the handle upper region and the handle lower region and configured to surround the outer surface of the shaft member when the shaft member penetrates the handle upper region and the handle lower region.

12. The handle device of claim 11, wherein a first recessed space having a shape recessed inward is formed by a surface of the handle upper region, a second recessed space having a shape recessed inward is formed by a surface of the handle lower region,
wherein the first recessed space and the second recessed space are configured to form an internal space when the handle upper region is coupled to the handle lower region via the shaft member, and
wherein the internal space is capable of accommodating the spring member.

13. The handle device of claim 12, wherein the internal space is capable of causing the spring member to be compressed.

14. The handle device of claim 12, wherein the spring member is in a compressed state in the internal space formed when the handle upper region and the handle lower region are in contact with each other.

15. A mobile apparatus comprising:
the handle device according to claim 1; and
a body to which the handle device is coupled.

16. The mobile apparatus of claim 15, further comprising:
a cap member provided at a second end of the handle lower region and having a screw thread region provided on an inner surface thereof.

17. The mobile apparatus of claim 16, wherein the body comprises a locking part provided in a region in which the handle device is coupled, the locking part having a space into which the second end of the handle lower region is insertable.

18. The mobile apparatus of claim 17, wherein a screw thread region, provided on an outer surface of the locking part, has a shape corresponding to the inner surface of the cap member.

19. An apparatus comprising:
a body comprising a plurality of wheels; and
a handle device coupled to the body,
wherein the handle device comprises:
a handle upper region;
a handle lower region coupled to the body and the handle upper region, wherein a first surface of the handle upper region faces a second surface of the handle lower region;
a shaft member configured to penetrate the handle upper region through a hole of a first portion of the handle upper region and the handle lower region through a hole of a second portion of the handle lower region; and
a support member coupled to a lower surface of a lower end of the handle upper region,
wherein a screw thread region is provided on an outer surface of the shaft member,
wherein the screw thread region is capable of being screw-coupled to one or more of the first portion or the second portion,
wherein the handle upper region comprises one or more first concave-convex shapes disposed peripherally to the first portion,
wherein the handle lower region comprises one or more second concave-convex shapes disposed peripherally to the second portion, wherein the one or more second concave-convex shapes are shaped corresponding to the one or more first concave-convex shapes so that the second surface of the handle lower region is able to be in close contact with the first surface, and
wherein the support member comprises an elastic material, and wherein a surface of the support member is exposed by a rotation of the handle upper region such that the exposed surface of the support member is able to contact a ground surface.

* * * * *